United States Patent [19]
Lanigan et al.

[11] 3,837,330
[45] Sept. 24, 1974

[54] HEAT-RETAINING SERVER

[75] Inventors: Richard W. Lanigan, Arlington Heights; Oleg Szymber, Elk Grove, both of Ill.

[73] Assignee: American Hospital Supply Corportion, Evanston, Ill.

[22] Filed: Mar. 28, 1973

[21] Appl. No.: 345,532

[52] U.S. Cl. .......... 126/246, 126/375, 220/10, 220/23.86, 220/68
[51] Int. Cl. ............................ A47g 23/04
[58] Field of Search ........ 126/246, 266, 273.5, 375; 220/9 R, 9 C, 10, 23.83, 23.86, 68, 69; 206/4; 99/401, 447

[56] References Cited
UNITED STATES PATENTS

| | | | |
|---|---|---|---|
| 1,000,172 | 8/1911 | Hopkins | 220/10 |
| 1,639,529 | 8/1927 | Payson et al. | 220/10 |
| 2,582,735 | 1/1952 | Alaj | 126/246 |
| 2,640,478 | 6/1953 | Flournoy | 126/246 |
| 3,148,676 | 9/1964 | Troug et al. | 126/246 |
| 3,557,734 | 1/1971 | Kreis | 126/246 |
| 3,734,077 | 5/1973 | Murdough et al. | 126/246 |
| 3,742,178 | 6/1973 | Harnden, Jr. | 220/9 R |

FOREIGN PATENTS OR APPLICATIONS

| | | | |
|---|---|---|---|
| 592,605 | 2/1960 | Canada | 126/246 |
| 691,191 | 7/1964 | Canada | 220/9 R |
| 950,885 | 2/1964 | Great Britain | 126/246 |

*Primary Examiner*—William I. Price
*Assistant Examiner*—Stephen Marcus

[57] ABSTRACT

A hollow food serving dish having upper and lower metal shells with a rigid heat-retaining member disposed therebetween. the shells are imperforate and are hermetically sealed together along their peripheral edges. Limited expansion is permitted upon heating, but the danger of bursting is avoided because of the secure interconnection between the upper shell and the rigid member and because of the interfitting relationship between the rigid member and the bottom shell with its concave configuration and peripheral shoulder.

10 Claims, 3 Drawing Figures

PATENTED SEP 24 1974  3,837,330

HEAT-RETAINING SERVER

BACKGROUND

U.S. Pat. No. 3,557,774 discloses a heat-storage dish of circular configuration which is composed essentially of an upper shell, a lower shell, and an annular heat-storage member locked therebetween. In the service of hot meals, such a dish is pre-heated to a suitable temperature so that when food is placed therein (normally such food is supported on a separate plate which is then received within the pre-heated dish), the heat retained by the dish will maintain the food at serving temperature for a substantial period of time. The problem, as brought out in the aforementioned patent, is that accidental overheating of such a server might cause permanent deformation of the shells and, even worse, a dangerous bursting apart of the server by reason of the build-up of air pressure therein. To prevent such bursting, the patent teaches that the central zones of the upper and lower shells must be welded together through the opening in the annular heat-retaining member.

Co-owned U.S. Pat. 3,734,077 (Ser. No. 234,945, filed Mar. 15, 1972) teaches that such a serving dish may be constructed without a central welded attachment between the upper and lower shells, and without danger of bursting upon heating to temperatures even substantially higher than the maximum temperatures encountered in commercial kitchens for the pre-heating of heat-storage dishes, if the upper and lower shells are generally rectangular rather than circular in shape. A generally rectangular heat-storage member or pellet is disposed between the shells and is supported upon a resilient pad of insulating material. Because of its resilience, the pad is capable of expanding to maintain the heat pellet in contact with the undersurface of the upper shell even when the shells bow outwardly to a slight extent at elevated temperatures. The extent of such deformation is limited largely by the rectangular configuration of the shells, for reasons explained in greater detail in that patent.

By eliminating the need for centrally welding both the upper and lower shells to each other or to an intermediate element, such rectangular dish construction has the advantages of being simpler and less expensive to fabricate. Nevertheless, the use of such a dish is necessarily limited by its rectangular configuration. For example, such a dish cannot accept a conventional plate of circular shape; instead, the plates used in conjunction with the rectangular server must also be of generally rectangular shape. The need therefore remains for an improved server of circular configuration which is relatively simple to fabricate and which is nevertheless capable of withstanding high temperatures without permanently deforming or bursting.

Other patents of interest are co-owned U.S. Pat. Nos. 3,436,097, 2,656,946, 2,709,534, 2,767,100, and Des. 191,124, as well as U.S. Pat. Nos. 2,830,576 and 2,582,735.

SUMMARY

One aspect of this invention lies in providing a heat-retaining food server which may be of circular configuration, or of any other suitable configuration, which is relatively simple and inexpensive to fabricate and, specifically, which does not require the upper and lower shells to be centrally welded together and does not require the use of a resilient pad between the bottom shell and the internal heat-storage member. By eliminating the need for a resilient pad, the air space within the vessel may be correspondingly reduced. In prior constructions, such a pad has performed the function, among others, of preventing movement of the annular heat-storage member relative to the upper and lower shells. To insure that the central portions of the upper and lower shells of such a prior construction might be forced into contact with each other for welding purposes, it was deemed necessary to provide a chamber between the shells having greater vertical dimensions than those of the heat-storage member. Because of such dimensional difference, movement of the heat-storage member within the chamber of the completed server would be possible unless some resilient means (such as a glass fiber pad) were compressed within the remaining space or unless some other means were provided for preventing relative movement of the heat-storage member (see U.S. Pat. No. 3,557,774). The present construction avoids such complexities and the expenses and other disadvantages associated with them.

More specifically, the server comprises a pair of upper and lower metal shells which are welded or otherwise sealingly joined together about their edges. A rigid heat-retention body or member is disposed within the space between the upper and lower shells and substantially fills that space. The body has a substantially flat upper surface which engages the undersurface of the upper shell's flat central portion. In the embodiment disclosed, the rigid heat-retention body is centrally apertured and a suspension member extends through that aperture and permanently and tightly secures the heat-retention body to the undersurface of the upper shell. In the manufacture of such a product, the step of mounting the heat-retention body to the upper shell is undertaken before the imperforate upper and lower shells are joined together about their peripheral edges.

The heat-retention body therefore braces the upper shell and reinforces it against deformation from any cause. The undersurface of the body is provided with an enlarged concavity terminating at its outer limits in a depending rim. The lower metal shell has a dome-shaped bottom wall, the curvature of which conforms with the concavity of the heat-retention body. Limited flexing movement of the dome-shaped bottom wall relative to the heat-retention body is possible; however, such flexure is resisted not only because of the dome-shaped configuration but also because the lower shell is provided with an annular shoulder which extends about the concave bottom wall and which bears against the depending rim of the heat-retention body. Pressure build-up within the server is therefore unlikely because the rigid heat-retention body occupies substantially the entire space between the shells, but even if a high pressure condition should occur because of exposure to temperature conditions far above anything encountered in a conventional kitchen, the relationship between the body and the lower shell, and the configuration of the lower shell, are capable of withstanding permanent deformation of the parts.

Other objects and advantages will appear from the specification and drawings.

THE DRAWINGS

DESCRIPTION

Figure 1:
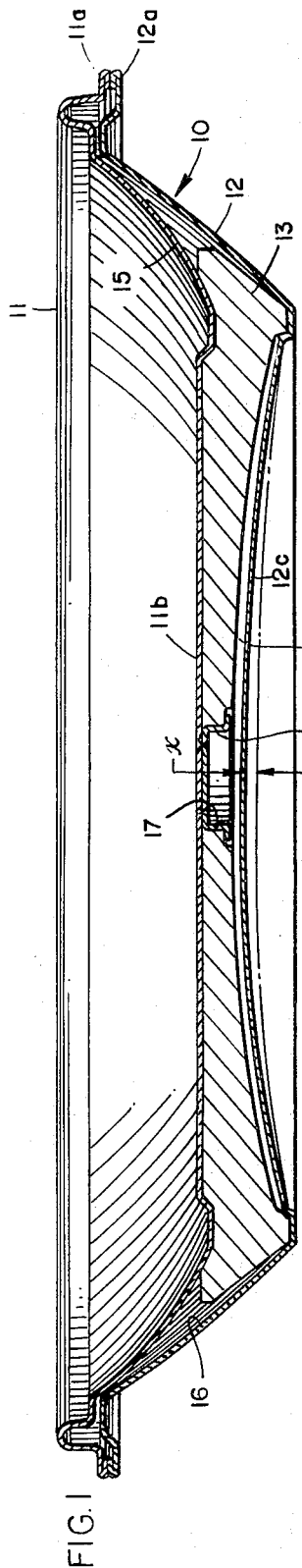
FIG. 1 is a vertical sectional view of a server embodying the present invention.

Numeral 10 generally designates a server comprising an upper metal shell 11, a lower metal shell 12, a heat-retention body or member 13, and a connecting or suspending member 14. The upper shell is recessed at 15 to receive a conventional plate (not shown) formed of china, glass, or any other suitable material. Also, a cover (not shown), formed of plastic or metal, would normally be fitted over the server to help retain heat and moisture as food is being transported from the kitchen to the place of food service.

The upper and lower shells may be formed from stainless steel or from any other material having similar properties of heat resistance, durability, and strength. The two shells are imperforate and are welded or otherwise securely and hermetically joined together along their peripheral edge portions 11a and 12a. Between the two shells is a space or chamber 16 which contains the heat-retention member 13. It will be observed that the heat-retention member occupies substantially all of the space between the shells.

The heat-retention member 13 is formed of aluminum, or an aluminum alloy, or some other rigid material having superior heat absorbing and retaining properties. While metal has been found particularly suitable for use in fabricating the heat-retention member, other materials such as ceramics might be used. The member 13 has an enlarged flat top surface 13a which bears against the undersurface of the upper shell's enlarged flat central portion 11b. A single opening 17 extends vertically through member 13 at its mid point and, as illustrated most clearly in FIG. 1, the hat-shaped connecting member 14 is received within opening 17. The flat top surface 14a of the connecting member is permanently secured (as by welding) to the undersurface of the upper shell and the brim or flange 14b of that member bears tightly against the undersurface of the heat-retention member 13 to secure the heat-retention member in firm engagement with the undersurface of the upper shell. It is believed apparent that in a manufacturing operation, connecting member 14 may be forced through opening 17 into tight engagement with the upper shell by suitable clamping tools, even if such clamping action strains (and slightly deforms) the flange 14b of the coupling member. By such an operation, a firm rattle-free attachment between the heat-retention member and the upper shell may be achieved and, since the connecting member will ultimately be concealed between the shells, any deformation of that member for the purpose of achieving tight attachment between the parts will not be visible in the finished product.

Figure 2:
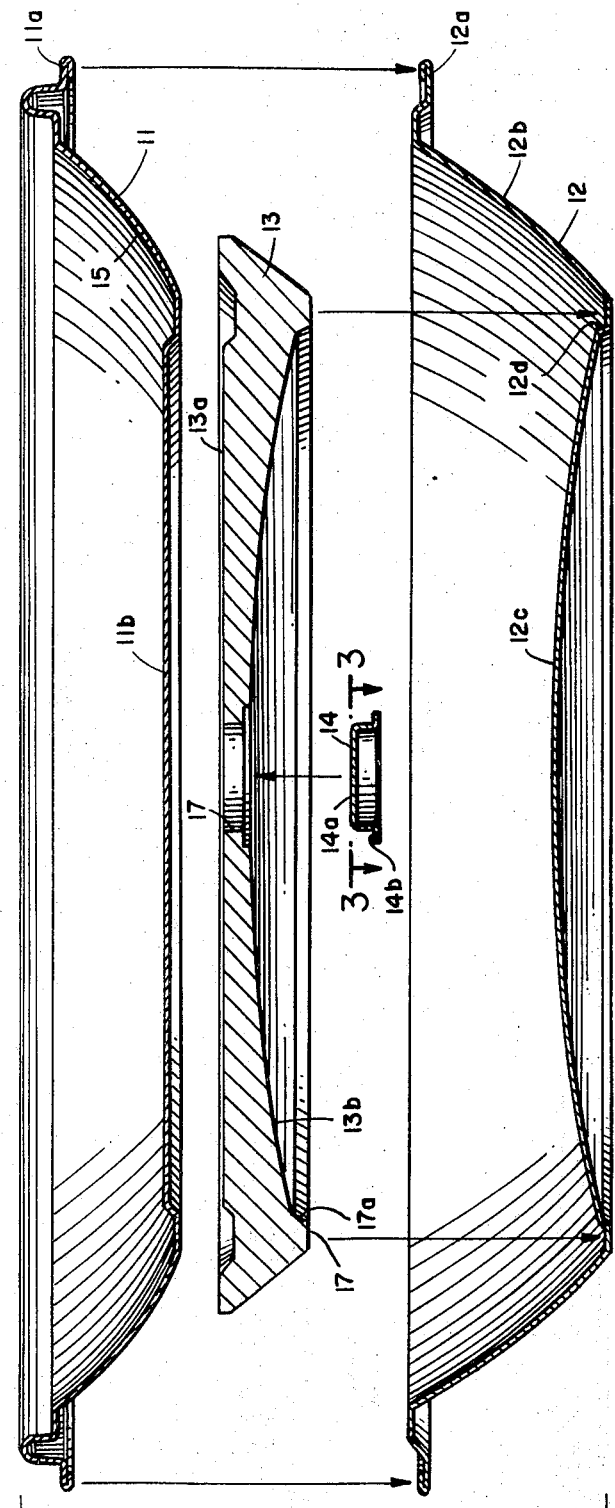
FIG. 2 is an exploded vertical sectional view.
Figure 3:
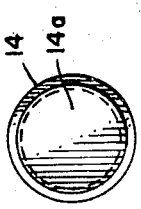
FIG. 3 is a top plan view taken along line 3—3 of FIG. 2.

Referring to FIG. 2, it will be seen that the heat-retention member or body 13 has an enlarged concave undersurface 13b. The concavity has a circular periphery bordered by a depending annular rim 17. It is to be noted that the annular rim 17 has an inwardly-facing surface 17a which is inclined slightly inwardly and which joins the outer limits of concave surface 13b.

The lower shell 12 is provided with a side wall 12b and a bottom wall 12c. The bottom wall 12c is dome-shaped throughout substantially its entire extent. It will be observed, however, that the top surface of the dome-shaped bottom wall 12c terminates in an upstanding annular shoulder 12d which bears against rim surface 17a of the heat-retention body when the parts are assembled (FIG. 1). While the dome-shaped bottom wall 12c conforms with and is received within the concavity 13b of the heat-retention member, a slight space 16a exists between the opposing surfaces in the finished product.

It has been found that a server of circular configuration, constructed as described above and large enough to contain the main course of a complete individual meal service, is capable of withstanding extremely high temperatures, specifically, temperatures well in excess of 1,000° F., without bursting or permanently deforming. Such temperatures are far in excess of those to which such a dish would be exposed in normal usage, and even well above those that might occur through accidental overheating. The capacity of the dish to withstand such temperatures is believed to result partly from the fact that the heat-retention member 13 occupies well over 75 percent, and preferably substantially all, of the space between the upper and lower shells, and partly because of the configuration of the parts and the cooperative relationship between the heat-retention member and the shells. Since the heat-retention member is rigidly connected to the upper shell and has a top surface substantially co-extensive with the flat top wall portion 11b of that shell, the heat-retention member effectively braces and reinforces the upper shell against deformation. Should the server be subjected to conditions under which the internal pressure greatly exceeds external pressure, some slight flexure of the dome-shaped bottom wall 12c of the lower shell is possible, as indicated by letter "x" in FIG. 1. Such flexure is resisted, however, by the dome-shaped configuration of that wall and by the abutting engagement between shoulder 12d and annular surface 17a. Stated differently, any force sufficient to cause a slight flattening of the dome-shaped bottom wall 12c, so that such wall flexes towards the broken-line position illustrated in FIG. 1, will be transmitted at least in part to the depending rim of the heat-storage member 13 because of the direct engagement between shoulder 12d and surface 17a.

While in the foregoing we have disclosed an embodiment of the invention in considerable detail for purposes of illustration, it will be understood by those skilled in the art that many of these details may be varied without departing from the spirit and scope of the invention.

We claim:

1. A heat-retaining food server comprising an upper metal shell having a substantially flat central portion, a lower metal shell hermetically sealed to said upper shell about only the peripheral edges thereof, said upper and lower shells defining a space therebetween, a rigid heat-retention body disposed within and substantially filling said space, said body having a substantially flat upper surface engaging the undersurface of said upper shell's flat central portion, and means rigidly securing said body to said upper shell, said body having a concave undersurface and said lower shell having a bottom wall of dome-shaped configuration throughout substantially its entire extent, the curvature of said dome-shaped bottom wall conforming with and being received within the concavity of said body.

2. The server of claim 1 in which said upper and lower shells are imperforate.

3. The server of claim 1 in which said heat-retention body is formed of metal.

4. The server of claim 1 in which said heat-retention body is provided with a central opening, said means comprising a connecting member extending through said opening and permanently fixed to the undersurface of said upper shell, said connecting member having a flange at its lower end larger than said opening, said flange engaging the undersurface of said body for holding said body tightly against the undersurface of said upper shell.

5. The server of claim 1 in which said upper and lower shells are circular in outline.

6. The server of claim 4 in which said heat-retention body is annular in configuration.

7. A heat-retaining food server comprising an upper metal shell having a substantially flat central portion, a lower metal shell hermetically sealed to said upper shell about only the peripheral edges thereof, said upper and lower shells defining a space therebetween, a rigid heat-retention body disposed within and substantially filling said space, said body having a substantially flat upper surface engaging the undersurface of said upper shell's flat central portion, and means rigidly securing said body to said upper shell, said body having a concave undersurface terminating at its outer limits in a depending rim defining an inwardly-facing annular surface, said lower shell having a bottom wall of dome-shaped configuration throughout substantially its entire extent, the curvature of said dome-shaped bottom wall conforming with and being received within the concavity of said body, said lower shell also having a shoulder extending about the dome-shaped bottom wall thereof and bearing against the inwardly-facing annular surface of said heat-retention body.

8. The server of claim 7 in which said upper and lower shells are generally circular in outline.

9. The server of claim 7 in which said heat-retention body is generally circular in outline and is formed of metal.

10. The server of claim 7 in which said heat-retention body is provided with a central opening, said means comprising a connecting member extending through said opening and being permanently fixed to the undersurface of said upper shell, said connecting member having a flange at its lower end larger than said opening, said flange engaging the undersurface of said body for holding said heat-retention body firmly against the undersurface of said upper shell.

* * * * *